(12) United States Patent
Barlaud et al.

(10) Patent No.: US 8,463,050 B2
(45) Date of Patent: Jun. 11, 2013

(54) METHOD FOR MEASURING THE DISSIMILARITY BETWEEN A FIRST AND A SECOND IMAGES AND A FIRST AND SECOND VIDEO SEQUENCES

(75) Inventors: Michel Barlaud, Valbonne (FR);
Sandrine Anthoine, Marseilles (FR);
Eric Debreuve, Cagnes sur Mer (FR);
Paolo Piro, Mougins (FR)

(73) Assignee: Centre National de la Recherche Scientifique (C.N.R.S.), Paris (FR)

( * ) Notice: Subject to any disclaimer, the term of this patent is extended or adjusted under 35 U.S.C. 154(b) by 998 days.

(21) Appl. No.: 12/385,378

(22) Filed: Apr. 7, 2009

(65) Prior Publication Data
US 2010/0254573 A1 Oct. 7, 2010

(51) Int. Cl.
*G06K 9/68* (2006.01)
*G06K 9/46* (2006.01)

(52) U.S. Cl.
USPC ........................................... 382/219; 382/190

(58) Field of Classification Search
USPC ................. 382/107, 173, 190, 219, 220, 224, 382/305, 312, 162; 345/597, 604
See application file for complete search history.

(56) References Cited

U.S. PATENT DOCUMENTS

| | | | |
|---|---|---|---|
| 6,195,458 B1 * | 2/2001 | Warnick et al. | 382/173 |
| 6,542,619 B1 * | 4/2003 | Jafarkhani et al. | 382/100 |
| 6,549,643 B1 * | 4/2003 | Toklu et al. | 382/107 |
| 6,804,683 B1 * | 10/2004 | Matsuzaki et al. | 1/1 |
| 7,551,234 B2 * | 6/2009 | Zhou et al. | 348/700 |
| 8,090,712 B2 * | 1/2012 | Shellshear | 707/723 |

* cited by examiner

*Primary Examiner* — Kanjibhai Patel
(74) *Attorney, Agent, or Firm* — Young & Thompson

(57) ABSTRACT

Method for measuring the dissimilarity between a first and a second images, including the following steps: a) multiresolution decomposition of the first and the second images to obtain coefficients of the first and of the second images, each coefficient being function of a scale and a location in space; b) constitution of the patches for the first and the second images; c) evaluation of the dissimilarity between the probability density functions of patches having a given scale and belonging to the first image and of patches having the same scale and belonging to the second image, the dissimilarity being a partial measure of the dissimilarity between the first and the second images; and a method for measuring the dissimilarity between a first and second video sequences, the method following a similar multi-scale approach based on sparse intrascale/interscale/interchannel patches and additionally taking motion into account.

22 Claims, 8 Drawing Sheets
(1 of 8 Drawing Sheet(s) Filed in Color)

METHOD FOR MEASURING THE DISSIMILARITY BETWEEN A FIRST AND A SECOND IMAGES AND A FIRST AND SECOND VIDEO SEQUENCES

TECHNICAL FIELD OF THE INVENTION

The present invention relates to a method for measuring the dissimilarity between images, a method for ranking images from the most similar to the less similar to a query image, a method for categorizing a query image into at least two categories and a method for measuring the dissimilarity between video sequences.

BACKGROUND OF THE INVENTION

Defining an objective measure of the dissimilarity between two images (or parts of them) is a recurrent question in image processing.

When dealing with denoising or deconvolution of images, a dissimilarity measure is needed to evaluate how well the estimate explains the observations. For these problems, efforts have been concentrated in the conditioning of the inverse operator as well as the spatial properties of the estimated images. The measure of fitness to the data is usually a simple Euclidean norm in pixel space such as:

$$d(I1, I2) = \sqrt{\sum_{i \in \{pixel\}} |I_1(i) - I_2(i)|^2}$$

wherein I1 and I2 are the compared images and d(I1, I2) is the measure of the dissimilarity between the images.

When dealing with tracking or image retrieval, the dissimilarity measure is needed to rank the images of a database according to their visual dissimilarity to a given query image.

In any case, a dissimilarity measure requires to define a feature space i.e. a set of properties that capture the relevant information contained in the image, and to define a dissimilarity measure in this feature space.

The feature space may be based on local or global descriptors. Local descriptors are made of a selected number of points of interest (or salient points) in the image together with a description of their neighborhood. The number of points of interest being limited, much information in the image is not used with these descriptors. The global descriptors such as histograms of intensity values include information of the whole image. The computation of global descriptors may be costly.

The dissimilarity measure can range from simple Euclidean norm to more sophisticated measures: robust estimators have been used for optical flow, Bhattacharya's distance for tracking, entropic measure such as entropy, mutual information for registration.

However, none of the dissimilarity measuring methods proposed until now is satisfactory.

It is desirable to develop a more effective method to measure the dissimilarity between images, as well as a method for ranking images from the most similar to the less similar to a query image, a method for categorizing a query image into at least two categories and a method for measuring the dissimilarity between video sequences.

SUMMARY OF THE INVENTION

Accordingly, it is an object of the invention to provide an improved method for measuring the dissimilarity between images.

Other features and advantages of the method are recited in the dependent claims.

In addition, the invention concerns a method for ranking images from the most similar to the less similar to a query image.

Further, the invention concerns a method for categorizing a query image into at least two categories.

Furthermore, the invention concerns a method for measuring the dissimilarity between video sequences.

Other features of this method are further recited in the dependent claims.

These and other aspects of the invention will be apparent from the following description and drawings.

BRIEF DESCRIPTION OF THE FIGURES

The file of this patent contains at least one drawing executed in color. Copies of this patent with color drawings will be provided by the Patent and Trademark Office upon request and payment of the necessary fee.

DETAILED DESCRIPTION

This description contains in a first part a theoretic demonstration of the principles used in the methods of the invention, and a detailed description of said methods in the second part.

As stated above, defining a measure of dissimilarity between a first image I1 and a second image I2 requires to define a feature space and a dissimilarity measure in this feature space.

According to the present invention, a feature space based on a sparse description of the image content is defined. To this end, a multiresolution decomposition is performed on the first image I1 and on the second image I2 to obtain two sets of multiscale coefficients $\{c(I1)_{j,k}\}_{j,k}, \{c(I2)_{j,k}\}_{j,k}$.

The multiresolution decomposition is for example a Laplacian pyramid decomposition. This particular multiscale transform is advantageous for its relative translation and rotation invariance properties.

In variant, other multiscale transforms having similar properties or introducing other characteristics such as orientation may be used (e.g. classical, complex and/or redundant wavelet transforms, steerable pyramid, bandlets, curvelets, etc.).

Throughout this document, a coefficient for the image I1 at scale j and location in space k, will be denoted $c(I1)_{j,k}$.

The idea of the present invention is to group the coefficients which are coherent together. Here the coherence is sought by grouping coefficients linked to a particular scale j and location k in the image. In fact, the most significant dependencies are seen between a coefficient $c(I1)_{j,k}$ and its closest neighbors in space: $c(I1)_{j,k\pm(0,1)}$, $c(I1)_{j,k\pm(1,0)}$ and in scale: $c(I1)_{j-1,k}$, where scale j-1 is coarser than scale j. So, the closest neighbors in scale and space of the coefficient $c(I1)_{j,k}$ are associated in a feature vector $W(I1)_{j,k}$, hereafter named patch:

$$W(I1)_{j,k}=(c(I1)_{j,k}, c(I1)_{j,k\pm(1,0)}, c(I1)_{j,k\pm(0,1)}, c(I1)_{j-1,k}) \quad (1.1)$$

The patch $W(I1)_{j,k}$ describes the structure of the grayscale image I1 at scale j and location k. It is representative of the pixel information around the location k.

Figure 1:
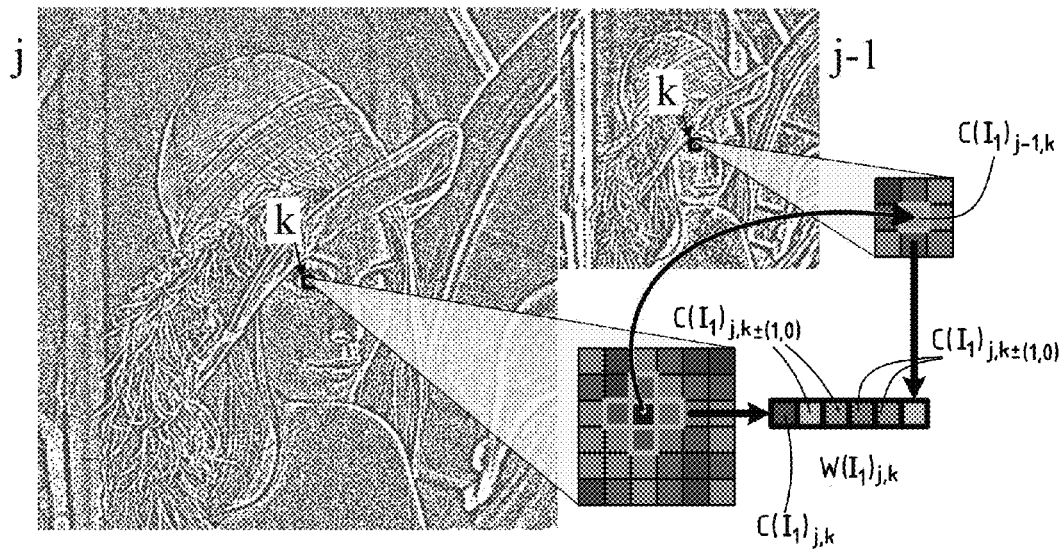
FIG. 1 is an image at scale j and at scale j-1 as well as one patch of this image.

The patch $W(I1)_{j,k}$ is illustrated in FIG. 1. It comprises five coefficients at scale j and one coefficient at scale j-1. Even if the patch $W(I1)_{j,k}$ comprises one coefficient $c(I1)_{j-1,k}$ at scale j-1, the patch is associated to scale j for the hereunder description.

In variant, the patch $W(I1)_{j,k}$ comprises other coefficients. In any case, it comprises at least two coefficients neighbors in space at scale j and one coefficient at the same location and at scale j-1.

When the first image I1 and the second image I2 are color images, each image can be considered as one image in the luminance space and two images in the chrominance space.

$$I=(I^Y, I^U, I^V)$$

Since the coefficients of an image are correlated through channels, the patches of the three channels are aggregated in an extended patch:

$$W(I^{YUV})_{j,k}=(W(I^Y)_{j,k}, W(I^U)_{j,k}, W(I^V)_{j,k}) \quad (1.2)$$

with $W(I^Y)_{j,k}$, $W(I^U)_{j,k}$ and $W(I^V)_{j,k}$ given by Equation (1.1).

The extended patch $W(I^{YUV})_{j,k}$ is a vector comprising the vectors or patches $W(I^Y)_{j,k}$, $W(I^U)_{j,k}$ and $W(I^V)_{j,k}$. For simplification reason, the extended patch $W(I^{YUV})_{j,k}$ is hereafter denoted $W_n$ and named patch.

To reduce the computation performed by the method, only the patches which represent the most relevant information are selected. Within the context of the invention, it has been established that the patches with the largest energies concentrate the information. The patches with the largest energies can be selected by summing the square of all coefficients in each patch and by comparing the value thus obtained to a threshold. On FIG. 2, the patches with the largest energies have been selected and are marked as white areas. In this figure, the threshold has been chosen in order to select 1/8 of the patches in each subband.

In variant, other selection procedures may be applied such as using the energy of the central coefficient, using the sum of absolute values in the patches or using a threshold based on the variance of the patches.

The feature space defined here is the set W of all patches $\{W(I)_{j,k}\}_{j,k}$, for all possible images. An image I1 is represented by its features, said features being its sets of patches $\{W(I1)_{j,k}\}_k$, for all scales j. An image I2 is represented by its features, said features being its sets of patches $\{W(I2)_{j,k}\}_k$, for all scales j.

A dissimilarity measure between two images I1 and I2 has to be defined from their features i.e. from their respective sets of patches $\{W(I1)_{j,k}\}_{j,k}$ and $\{W(I2)_{j,k}\}_{j,k}$. When images are clearly similar (e.g. different views of the same scene, images containing similar objects . . . ), patches with similar structures are not necessarily located at identical positions. Hence a measure comparing geometrically corresponding patches i.e. patches having the same location k and scale j, would not be robust to geometric transformations. Thus, the present invention proposes to compare the probability density functions of patches using statistical divergence (because these functions characterize fine spatial structures at each scale) and to determine the divergences between these functions in a non-parametric context.

Specifically, for each scale j the probability density functions $p_j(I1)$ of the set of patches $\{W(I1)_{j,k}\}_k$ of image I1 is considered.

To compare two probability density functions, the invention suggests using the Kullback-Leibler divergence. This divergence derives from the function $f(x)=x \log x$.

In variant, the dissimilarity between probability density functions can be evaluated via other statistical measures than the Kullback-Leibler divergence, e.g. the Battacharya measure, mutual information, the Hellinger distance, or more generally a Bregman divergence. Symmetrized versions of these measures may be considered as well.

The Kullback-Leibler divergence (D) is the following quantity:

$$D(p_j(I1) \| p_j(I2)) = \int p_j(I1) \log \frac{p_j(I1)}{p_j(I2)} \quad (1.3)$$

The dissimilarity S(I1, I2) between the first image I1 and the second image I2 is obtained by measuring the Kullback-Leibler divergences between the probability density functions $p_j(I)$ of these images.

Advantageously, the dissimilarity S(I1, I2) can be measured by summing over scales j the divergences between the probability density functions $p_j(I1)$ and $p_j(I2)$:

$$S(I_1, I_2) = \sum_j a_j D(p_j(I1) \| p_j(I2)) \quad (1.4)$$

where $a_j$ is a positive weight that may normalize the contribution of the different scales.

The Kullback-Leibler divergence can be written as the difference between a cross-entropy Hx and an entropy H:

$$H_x(p_j(I1), p_j(I2))=-\int p_j(I1) \log p_j(I2) H(p_j(I1))=-\int p_j(I1) \log p_j(I1) \quad (1.5)$$

These terms can be estimated from an i.i.d sample set $S1=\{W^1_1, W^1_2, \ldots, W^1_{N1}\}$ of probability density function $p_j(I1)$ of the first image I1, and an i.i.d sample set $S2=\{W^2_1, W^2_2, \ldots, W^2_{N2}\}$ of probability density function $p_j(I2)$ of the second image I2. (The samples are in $R^d$). $N_1$ is the number of patches of the first image I1 at scale j. $N_2$ is the number of patches of the second image I2 at scale j.

In the following, the estimate of the probability density functions $p_j(I1)$, $p_j(I2)$ is denoted $\hat{p}_j(I1), \hat{p}_j(I2)$. The Ahmad-Lin entropy estimators are introduced in the Kullback-Leibler divergence. Thus, equation (1.5) becomes:

$$H_x^{a1}(\hat{p}_j(I1), \hat{p}_j(I2)) = -\frac{1}{N_1} \sum_{n=1}^{N_1} \log[\hat{p}_j(I2)(W_n^1)] \quad (1.6)$$

$$H^{a1}(\hat{p}_j(I1)) = -\frac{1}{N_1} \sum_{n=1}^{N_1} \log[\hat{p}_j(I1)(W_n^1)]$$

General non-parametric probability density function estimators can be written as a sum of kernels K with (possibly varying) bandwidth h:

$$\hat{p}_j(I1)(x) = -\frac{1}{N_1} \sum_{n=1}^{N_1} K_{h(S1,x)}(x - W_n^1) \quad (1.7)$$

In the present case, a Balloon estimator with a binary kernel and a bandwidth computed in the k-th nearest neighbor (kNN) framework has been used: $h(S1, x) = h_{S1}(x)$. Such an estimator is well known. A description can be found in "Jan Puzicha, Yossi Rubner, Carlo Tomasi, and Joachim M. Buhmann. *Empirical evaluation of dissimilarity measures for color and texture.* In ICCV, pages 1165-1172, 1999".

This is the dual approach to the fixed size kernel methods. The bandwidth adapts to the local sample density by letting the kernel contain exactly k neighbors of x among a given sample set:

$$K_{h(x)}(x - W_n1) = \frac{1}{v_d \rho_{k,S1}^d(x)} d[\|x - W_n^1\| < \rho_{k,S1}(x)] \quad (1.8)$$

with $v_d$ the volume of the unit sphere in $R^d$ and $\rho_{k,S1}(x)$ the distance from x to its k-th nearest neighbor in S1. Although this is a biased probability density function estimator (because it does not integrate to one), it is efficient for high-dimensional data. Plugging Equation (1.8) in Equations (1.7) and (1.6), the following estimators of the cross-entropy and of the entropy are obtained:

$$H^{knn}(\hat{p}_j(I1)) = \log(N_1 v_d) - \log k + \frac{d}{N_1} \sum_{n=1}^{N_1} \log[\rho_{k,S1}(W_n^1)] \quad (1.9)$$

$$H_x^{knn}(\hat{p}_j(I1), \hat{p}_j(I2)) = \log(N_2 v_d) - \log k + \frac{d}{N_1} \sum_{n=1}^{N_1} \log[\rho_{k,S2}(W_n^1)] \quad (1.10)$$

As previously, these estimators are biased. In the non-biased estimators of the (cross)-entropy the digamma function $\psi(k)$ replaces the $\log(k)$ term:

$$H^{knn}(\hat{p}_j(I1)) = \log((N_1 - 1)v_d) - \psi(k) + \frac{d}{N_1} \sum_{n=1}^{N_1} \log[\rho_{k,S1}(W_n^1)] \quad (1.11)$$

$$H_x^{knn}(\hat{p}_j(I1), \hat{p}_j(I2)) = \log(N_2 v_d) - \psi(k) + \frac{d}{N_1} \sum_{n=1}^{N_1} \log[\rho_{k,S2}(W_n^1)] \quad (1.12)$$

And hence the Kullback-Leibler divergence reads:

$$D(\hat{p}_j(I1), \hat{p}_j(I2)) = \quad (1.13)$$

$$\log\left(\frac{N_2}{N_1 - 1}\right) + \frac{d}{N_1} \sum_{n=1}^{N_1} \log[\rho_{k,S2}(W_n^1)] - \frac{d}{N_1} \sum_{n=1}^{N_1} \log[\rho_{k,S1}(W_n^1)]$$

where:
d is the number of coefficients in a patch, or patch dimension;
$N_1$ is the number of patches selected in the first image I1;
$N_2$ is the number of patches selected in the second image I2;
$W^1_n$ is one patch of the first image I1;
$\rho_{k,S1}(W^1_n)$ is the distance from patch $W^1_n$ to its k-th nearest neighbor in S1;
S1 is the set of selected patches of the first image I1;
$\rho_{k,S2}(W^1_n)$ is the distance from patch $W^1_n$ to its k-th nearest neighbor in S2;
S2 is the set of selected patches of the second image I2;
and k is called the neighboring order.

Thus, the invention proposes to combine the Ahmad-Lin approximation of the entropies necessary to compute the divergences with "balloon estimates" of the probability density functions using the kNN approach.

In variant, a Parzen estimator $h(S1, x) = h$ and a Sample Point Estimator $h(S1, x) = h_{S1}(w1i)$, $i = \{1 \ldots N_1\}$, could also be used instead of the Balloon estimator.

Figure 3:
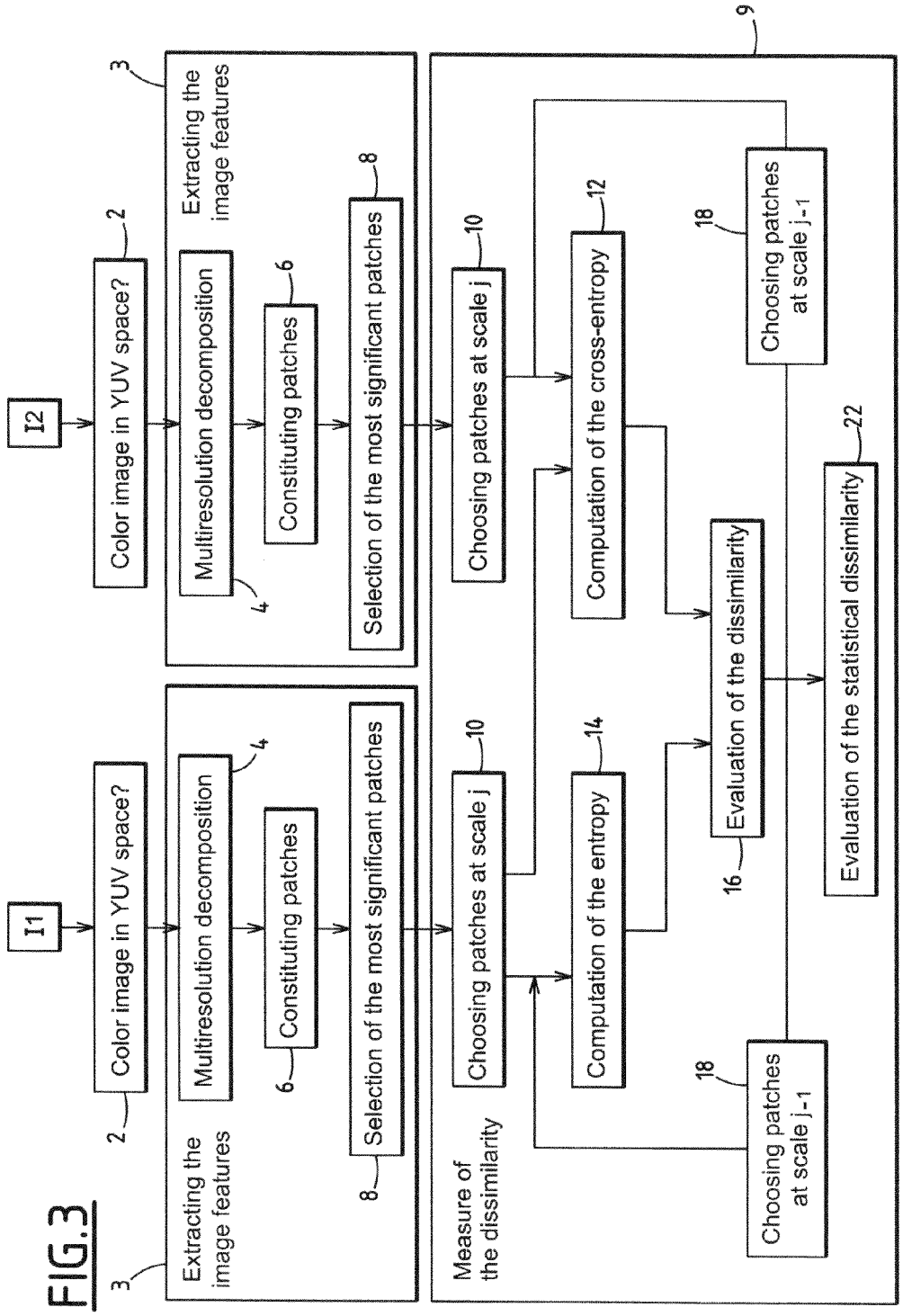
FIG. 3 is a flowchart of the method according to the invention.
Figure 4:
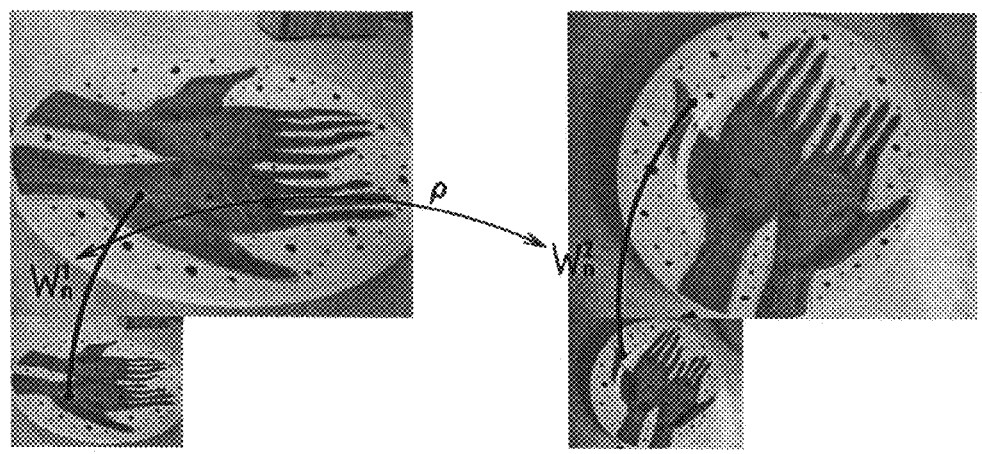
FIG. 4 is a schematic representation of a distance between a patch from the first image and a patch from the second image.
Figure 5:
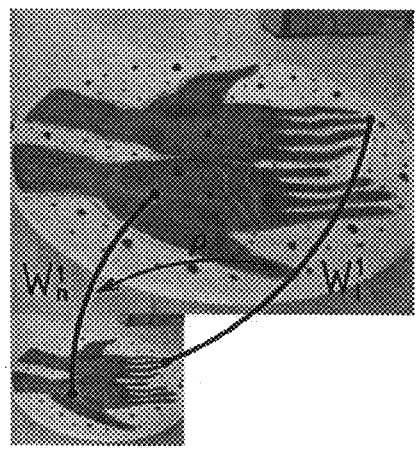
FIG. 5 is a schematic representation of a distance between two patches from the first image.

In reference to FIG. 3, the method according to the invention begins with step 2 of verification that the first image I1 and the second image I2 are in the YUV color space. If these images are in another color space (e.g. the RGB color space), they are converted in the YUV space using the commonly known equations.

According to a first stage 3, the image features are extracted following the definition of the feature space W.

The first stage 3 begins with a step 4 during which a multiresolution decomposition, for example a Laplacian pyramid decomposition is performed on each component Y, U, V of the first image I1 and on each component Y, U, V of the second image I2.

In step 6, patches $W(I1^Y)_{j,k}$, $W(I1^U)_{j,k}$, $W(I1^V)_{j,k}$, $W(I2^Y)_{j,k}$, $W(I2^U)_{j,k}$, $W(I2^V)_{j,k}$ are constituted for each color component of the first image I1 and the second image I2.

Each patch $W(I1^Y)_{j,k}$ at a given scale j and location k comprises a coefficient $c(I1^Y)_{j,k}$ at this scale j and location k, and its closest neighbors in location: $c(I1^Y)_{j,k\pm(0,1)}$, $c(I1^Y)_{j,k\pm(1,0)}$ as well as the coefficient at its location k but at the coarser scale j-1: $c(I1^Y)_{j-1,k}$ For each image:

$$W(I1^Y)_{j,k} = (c(I1^Y)_{j,k}, c(I1^Y)_{j,k\pm(1,0)}, c(I1^Y)_{j,k\pm(0,1)}, c(I1^Y)_{j-1,k})$$

$$W(I1^U)_{j,k} = (c(I1^U)_{j,k}, c(I1^U)_{j,k\pm(1,0)}, c(I1^U)_{j,k\pm(0,1)}, c(I1^U)_{j-1,k})$$

$$W(I1^V)_{j,k} = (c(I1^V)_{j,k}, c(I1^V)_{j,k\pm(1,0)}, c(I1^V)_{j,k\pm(0,1)}, c(I1^V)_{j-1,k})$$

Where $c(I1^Y)_{j,k}$, $c(I1^Y)_{j,k\pm(1,0)}$, $c(I1^Y)_{j,k\pm(0,1)}$, $c(I1^Y)_{j-1,k}$ are the coefficients of the luminance component of the first image I1, and $c(I1^U)_{j,k}$, $c(I1^U)_{j,k\pm(1,0)}$, $c(I1^U)_{j,k\pm(0,1)}$, $c(I1^U)_{j-1,k}$, $c(I1^V)_{j,k}$, $c(I1^V)_{j,k\pm(1,0)}$, $c(I1^V)_{j,k\pm(0,1)}$, $c(I1^V)_{j-1,k}$ are the coefficients of the chrominance components of the first image I1.

Then, an extended patch is constituted for each image:

$$W(I1^{YUV})_{j,k} = (W(I1^Y)_{j,k}, W(I1^U)_{j,k}, W(I1^V)_{j,k})$$

$$W(I2^{YUV})_{j,k} = (W(I2^Y)_{j,k}, W(I2^U)_{j,k}, W(I2^V)_{j,k})$$

The extended patches $W(I1^{YUV})_{j,k}$ and $W(I2^{YUV})_{j,k}$ are hereafter denoted by $W^1_n$ and $W^2_n$ respectively, and named patches.

A patch is illustrated in FIG. 1 for one color channel.

In step 8, the patches having the largest energies are selected. This selection is, for example, performed by summing the square of all coefficients in a patch and by comparing the value thus obtained to a threshold.

Figure 2:
FIG. 2 shows the area of large energy in the image of FIG. 1 at scale j, j-1 and j-2.

The patches with the largest energies are illustrated in white on FIG. 2.

The image features following the definition of the feature space W have now been extracted. They comprise the patches illustrated in white on FIG. 2.

The stage 9 of measure of the dissimilarity begins with a step 10 during which only the patches at scale j of the first image I1 and of the second image I2 are processed. These patches constituted the set S1 and the set S2.

In step 12, the cross entropy $H_x(p_j(I1), p_j(I2))$ between the probability density function $p_j(I1)$ of the first image patches and of the probability density function $p_j(I2)$ of the second image patches, is computed.

Step 12 comprises a sub-step 12A during which a patch $W^1_n$ of the first image I1 is selected among the patches of the set S1.

Then, at sub-step 12B, a patch $W^2_I$ is selected among the patches of the set S2. This patch is selected in order to be the k-th nearest patch of the patch $W^1_n$ selected at step 12A. The patches of S2 are ranked from the one having the most similar coefficients to those of the selected patch of S1 to the one having the coefficients least similar to those of the selected patch of S1. The "k-th nearest patch" is the patch of S2 ranked number k. The similarity between two sets of coefficients is defined as a given norm in $R^d$, where R is the set of real numbers. In the invention, the L2 norm has been chosen. In variant, other norms or even measures that do not respect all the properties of a norm, e.g., a Bregman divergence may be chosen.

At sub-step 12C, the distance $\rho_k$ from the patch $W^1_n$ selected at step 12A to the k-th nearest patch $W^2_I$ selected at sub-step 12B is evaluated and the logarithm of this distance is computed.

Sub-steps 12A to 12C are repeated for the patches of the set S1. The obtained logarithms are summed and multiplied by the term $(d/N_1)$ to obtain the second term of equation (1.13).

In step 14, the entropy $H(p_j(I1))$ of the probability density function of the first image patches is computed.

Step 14 comprises a sub-step 14A during which a patch $W^1_n$ of the first image I1 is selected among the set S1.

Then, at sub-step 14B, a patch $W^1_I$ is selected among the patches of the set S1. This patch is selected in order to be the k-th nearest patch of the patch $W^1_n$ selected at step 14A.

At sub-step 14C, the distance $\rho_k$ from the patch $W^1_n$, selected at step 14A to the k-th nearest patch $W^1_I$ selected at sub-step 14B is evaluated and the logarithm of this distance is computed.

Steps 14A to 14C are repeated for all the patches of the set S1.

The obtained logarithms are summed and multiplied by the term $(d/N_1)$ to obtain the third term of equation (1.13).

In step 16, a first measure of dissimilarity $D(\hat{p}_j(I1), \hat{p}_j(I2))$ at scale j of the first and the second images is evaluated.

To this end, the difference between the cross entropy computed in step 12 and the entropy computed in step 14 is calculated and added to the computation of the first term of equation (1.13).

In step 18, steps 10 to 16 are repeated for all scales of the patches. In other words, steps 10 to 16 are repeated a first time for the patches at scale j-1 and a second time for the patches at scale j-2, etc., until the last scale obtained from the multi-resolution decomposition.

At step 22, the dissimilarities $D(\hat{p}_j(I1), \hat{p}_j(I2))$ computed at step 16 for each scale are summed to obtain the measure of dissimilarity $S(I_1, I_2)$ between the first and the second images. This step is represented by equation (1.4).

In the described embodiment of the invention, the considered probability density functions summarize the distribution of patches centered at scale j (computations on a per-scale basis). In variant, the patches may be grouped in different ways, hence leading to consider different probability density functions. In particular, all the patches corresponding to a given object can be selected in order to build a single probability density function which describes the local features of the object through all the scales (computations on a per-object basis).

The dissimilarity measure computation method presented above can be used to solve the problem of content-based image retrieval which consists in finding the images in a given database that resemble the most to a query image given by the user.

Figure 6:
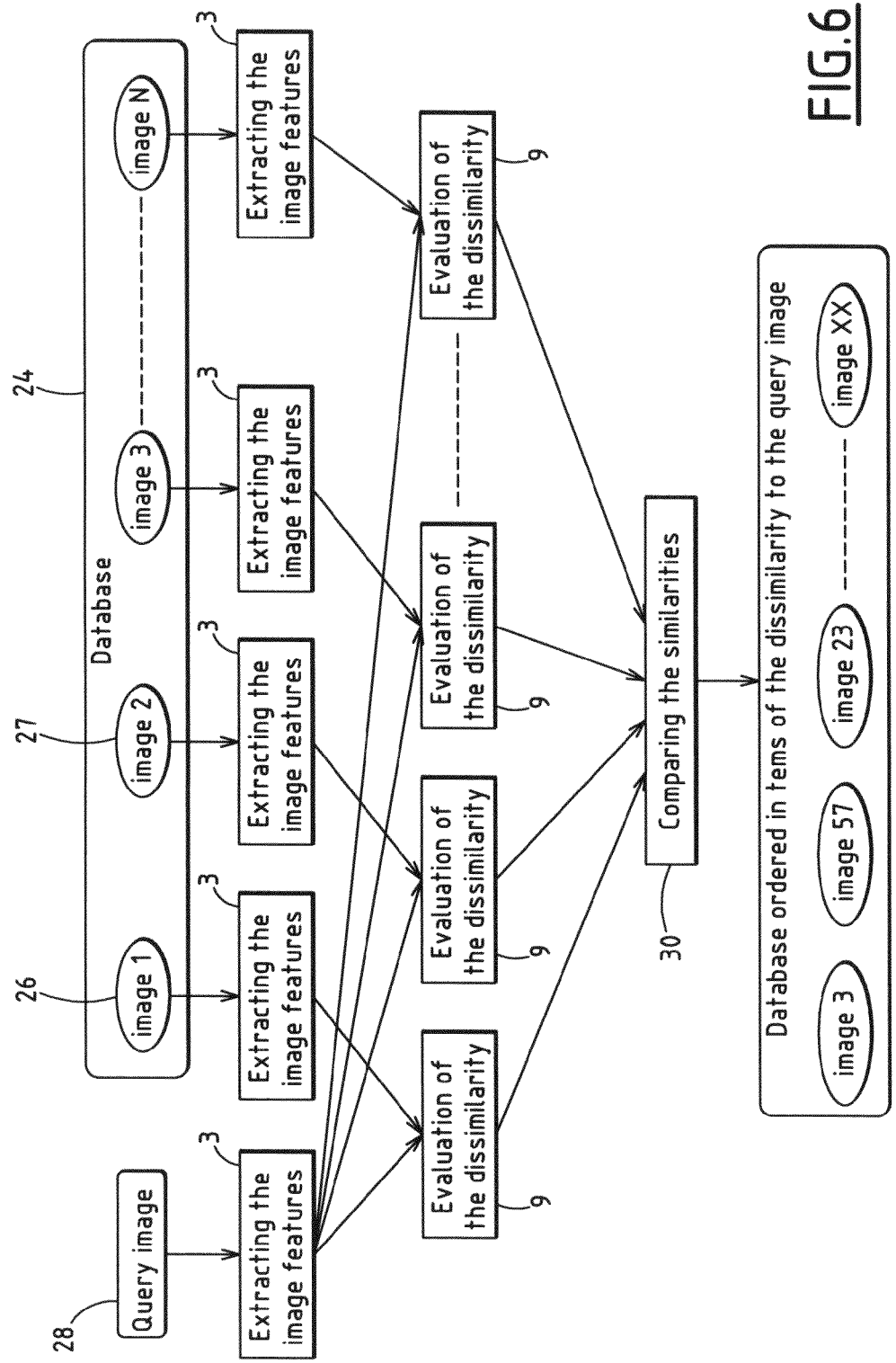
FIG. 6 is a block diagram illustrating the use of the method for measuring the dissimilarity for content-based image retrieval.

In this instance, the present invention also concerns a method for ranking the database images from the most similar to the less similar to a query image. In reference to FIG. 6, a database 24 comprises N target images 26, 27 to order from the most to the less similar to a query image 28.

The ranking method begins with a first stage 3 during which the image features for the query image 28 and the target image 26 are extracted following the definition of the feature space W. The first stage 3 comprises steps 4 to 8 described here-above and illustrated in FIG. 3.

Then, the dissimilarity between the query image 28 and the target image 26 is evaluated at a second stage 9. The second stage 9 comprises steps 10 to 22 defined here-above and illustrated in FIG. 3.

Then, the first stage 3 is performed on the target image 27. The second stage 9 is performed on the query image 28 and on the target image 27 to evaluate their dissimilarity.

Stages 3 and 9 are performed for all target images of the database 24. Finally, in step 30, the similarities computed at each stage 9 are compared and ranked from the lowest to the highest.

Advantageously, no prior annotation (text annotation in particular) of the considered images is performed.

The present invention also concerns a method for categorizing images in different categories.

Image categorization is the problem of finding in which category a query image 32 given by the user belongs to among predefined categories 34, 36, 38. In this case, a database partitioned in categories is given (i.e. a database in which each image is labeled with its corresponding category).

The task is generally solved in two steps: 1) a training step where one learns the characteristics of each category by studying the labeled database and 2) a classification step where a given query image is assigned a label.

The method of measure of the dissimilarity according to the present invention is used in both steps. In the training step illustrated in FIG. 7, it is used to compare the images of the same category with each other and to define a prototype representing their common characteristics (e.g. representative patches, or a representative image). In the classification step illustrated in FIG. 8 the method of measure of the dissimilarity according to the present invention is used to compare the query image to each prototype.

Figure 7:
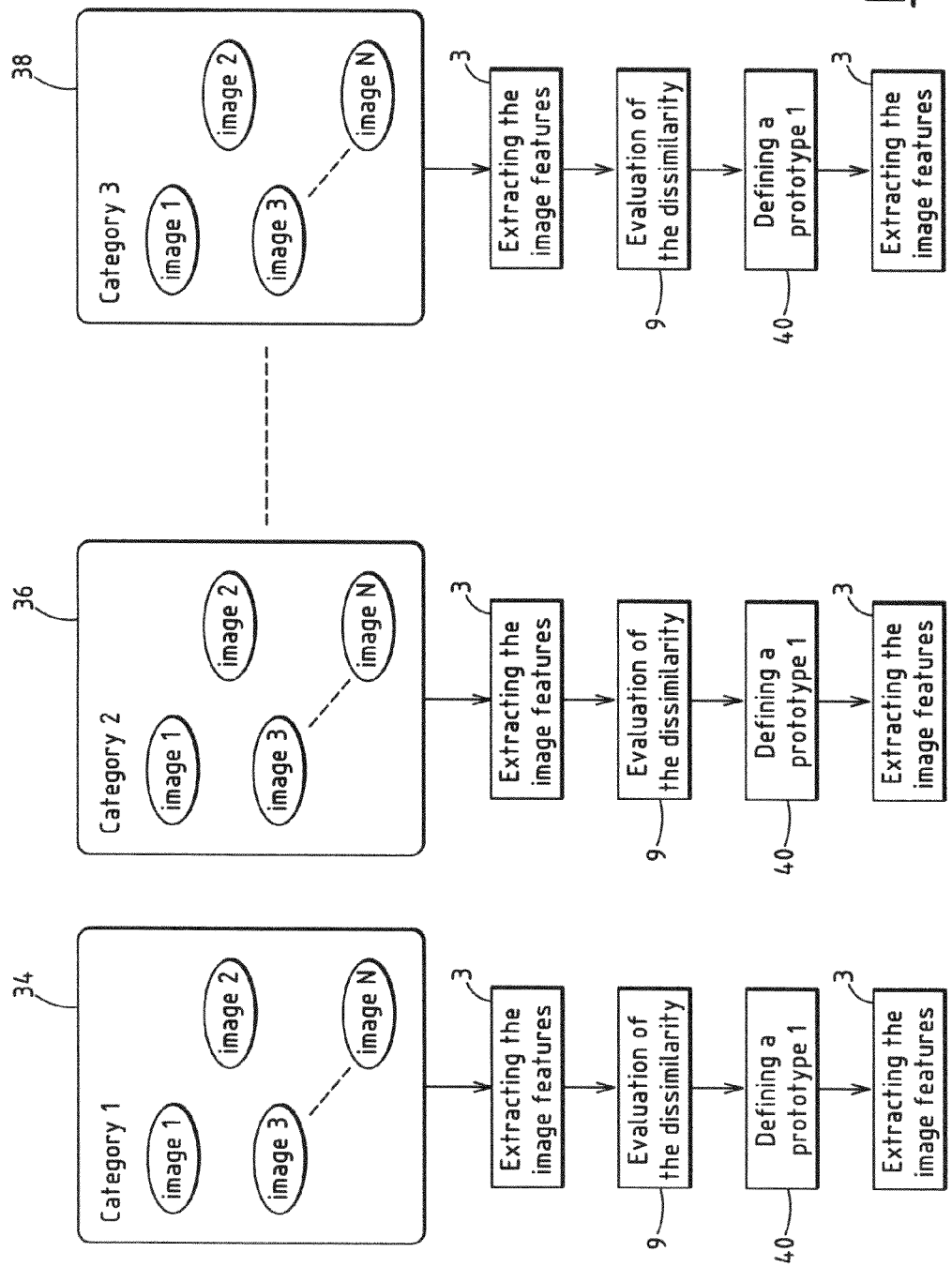
FIG. 7 is a block diagram illustrating the use of the method for measuring the dissimilarity for the training step of image categorization.

In reference to FIG. 7, during the training step the image features for the images of each category 34, 36, 38 are extracted following the definition of the feature space W by performing the first stage 3 on each of these images. Then, the dissimilarities between all pairs of images taken in each category are evaluated by performing the second stage 9 on each pair of images.

Then, in step 40, a prototype is constituted for each category. This prototype is a representative image of the given category: it is a barycenter of the given category according to the dissimilarity measure defined in Equation (1.4).

In variant, the prototype is a set of representative patches of the given category selected by a thresholding method.

Figure 8:
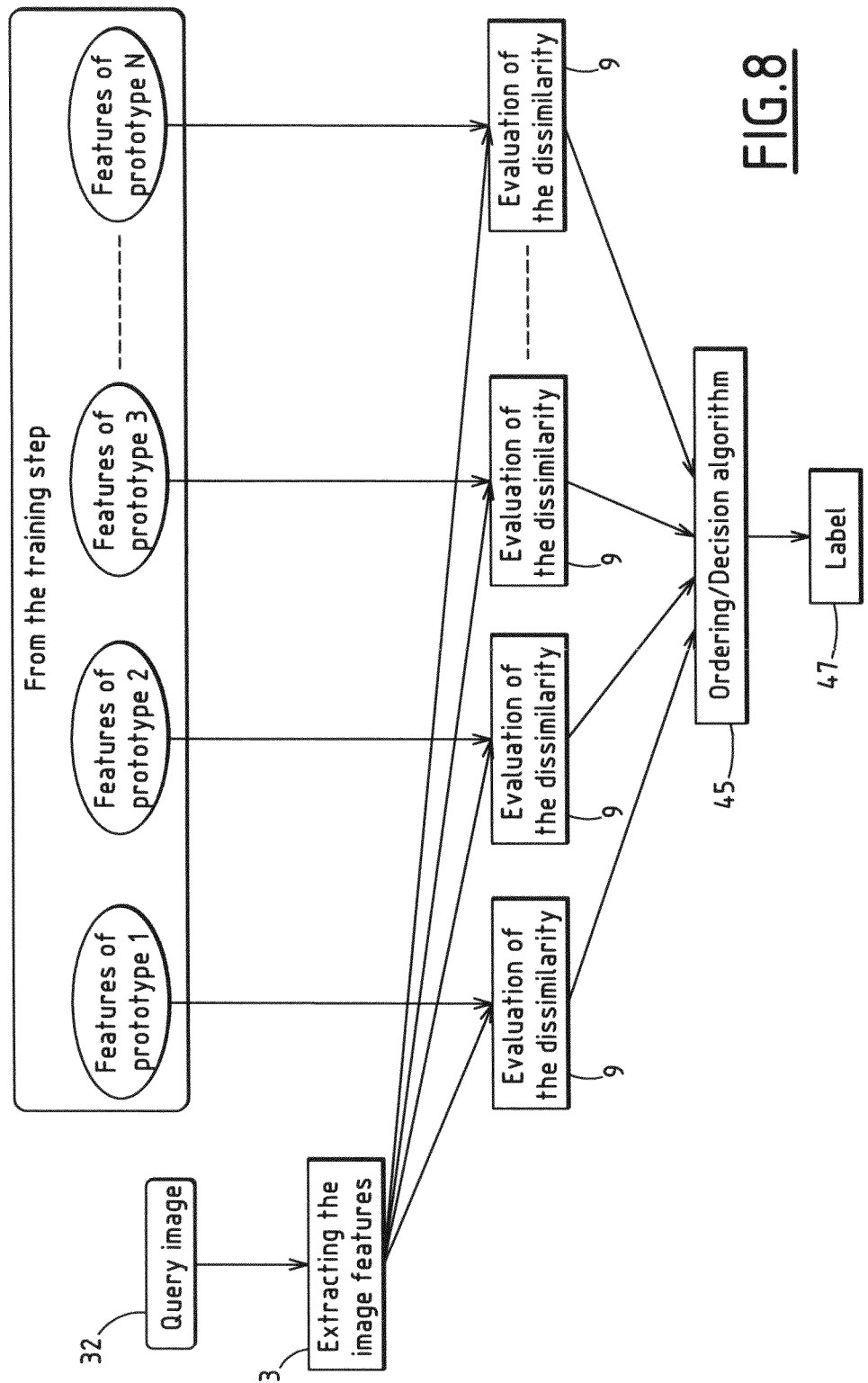
FIG. 8 is a block diagram illustrating the use of the method for measuring the dissimilarity for the classification step of image categorization.

In reference to FIG. 8 during the classification step, the first stage 3 is performed on the query image 32.

Then, still in reference to FIG. 8, stage 9 is performed for all pairs of images constituted by the query image 32 and each prototype.

Finally, in step 45, the dissimilarities computed at each stage 9 are compared and the lowest one is selected. The query image 32 belongs to the category of the prototype of which the dissimilarity is the lowest.

A label is attributed to it at step 47.

Several practical applications rely on good image categorization and can be developed using this technology. A first example is the automatic recognition of objects at the cash register in a supermarket or shop. The issue is to build an automatic cash register (without bar code) that simply recognizes the item shown and that will replace the human cashier. The task will be made possible via an image categorization algorithm that learns to recognize each item in the shop by analyzing a set of images of this item taken from different angles.

Another practical application of image categorization is the design of systems that help disabled people by analyzing the indoor and outdoor scenes and describing their main components.

The patches introduced in Equation (1.2) describe the local spatial information contained in a still image. This concept can be also used to describe efficiently the "local" features of a video. The relevant information in a video consists not only in the spatial characteristics of the frames in the video but also in the so-called apparent motion which characterizes the visual changes from one frame to the next in the video.

The present invention also concerns a method for measuring the dissimilarity between a first video sequence 54 and a second video sequence 50.

In particular, one builds motion patches m(x,y) that describe the motion at location (x, y) through n consecutive images f1, ..., fn:

$$m(x,y)=(x,y,\vec{u}_{f_1,f_2}(x,y),\vec{u}_{f_2,f_3}(x,y),\ldots,\vec{u}_{f_{n-1},f_n}(x,y)) \quad (3.1)$$

where $\vec{u}_{f_1,f_2}(x, y)$ is the apparent motion of point (x, y) from image f1 to image f2.

Figure 9:
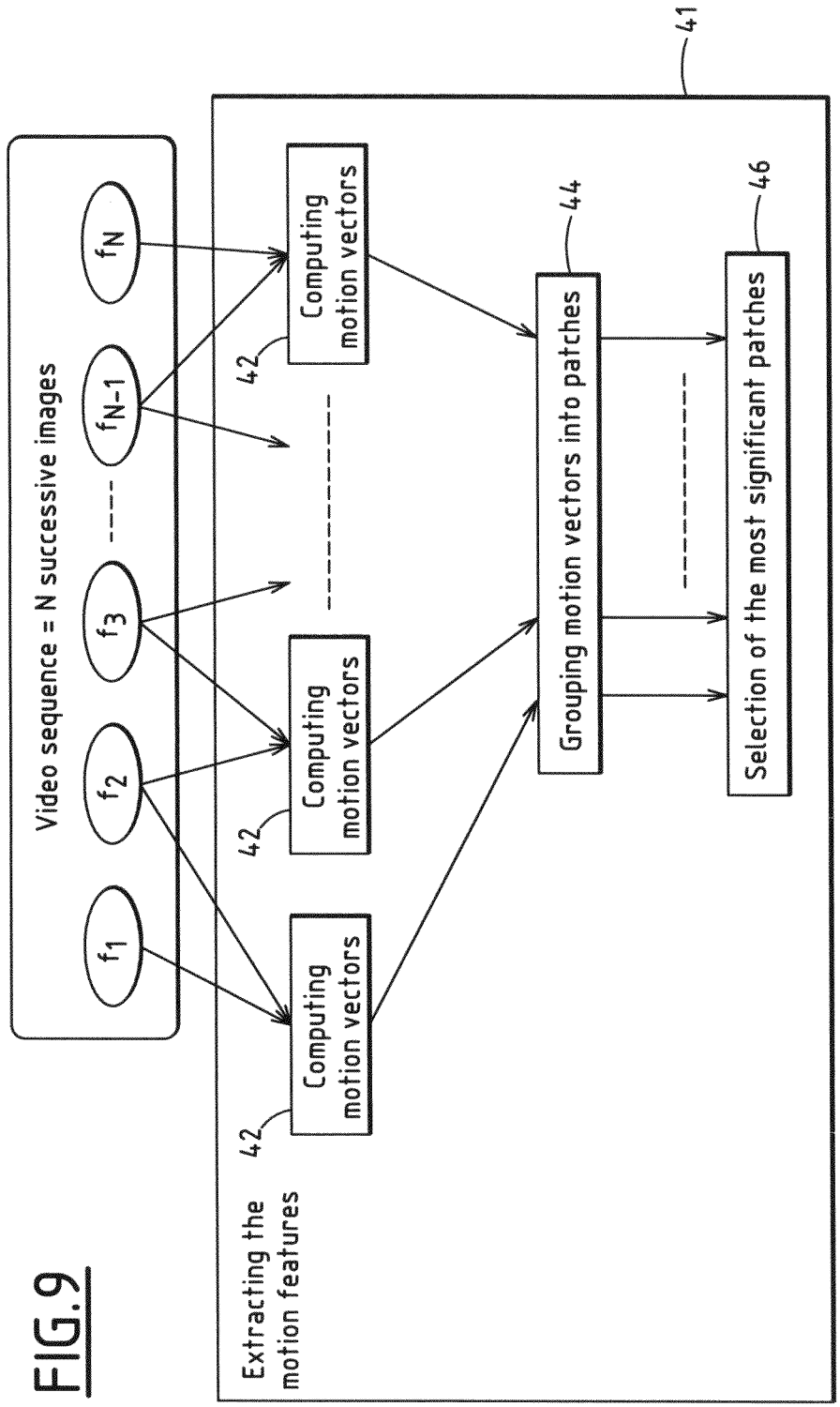
FIG. 9 is a block diagram illustrating the constitution of a motion space used in the method for measuring the dissimilarity between two video sequences.

In reference to FIG. 9, the method for measuring the dissimilarity between video sequences comprises a stage 41 of extraction of motion patches for each video sequence. Stage 41 comprises:

a step 42 during which motion vectors between successive images f1, f2 are computed;

a step 44, during which motion patches are constituted; each patch comprising motion vectors of each video sequence; and a step 46 during which the most significant patches are selected. As in step 8, the patches having the largest energies are selected.

Then, the dissimilarity between the probability density function of the motion patches belonging to the first video sequence 54 and the probability density function of the motion patches belonging to the second video sequence 50 is evaluated.

To this end, the Kullback-Leibler divergence is computed according to steps 12 to 16 described above and illustrated in FIG. 3.

Content-based video retrieval is the task of finding similar Groups of Pictures (or GOP, which are successions of a few successive images, typically 8 or 16 images), video sequences or whole videos in a video database given a query GOP, video sequence or video. Solutions to this problem are designed using the dissimilarity evaluation method of the present invention.

Particularly, a combined version of the method of measure of dissimilarity of spatial patches of Equation (1.2) with the motion patches is proposed by the present invention.

Figure 10:
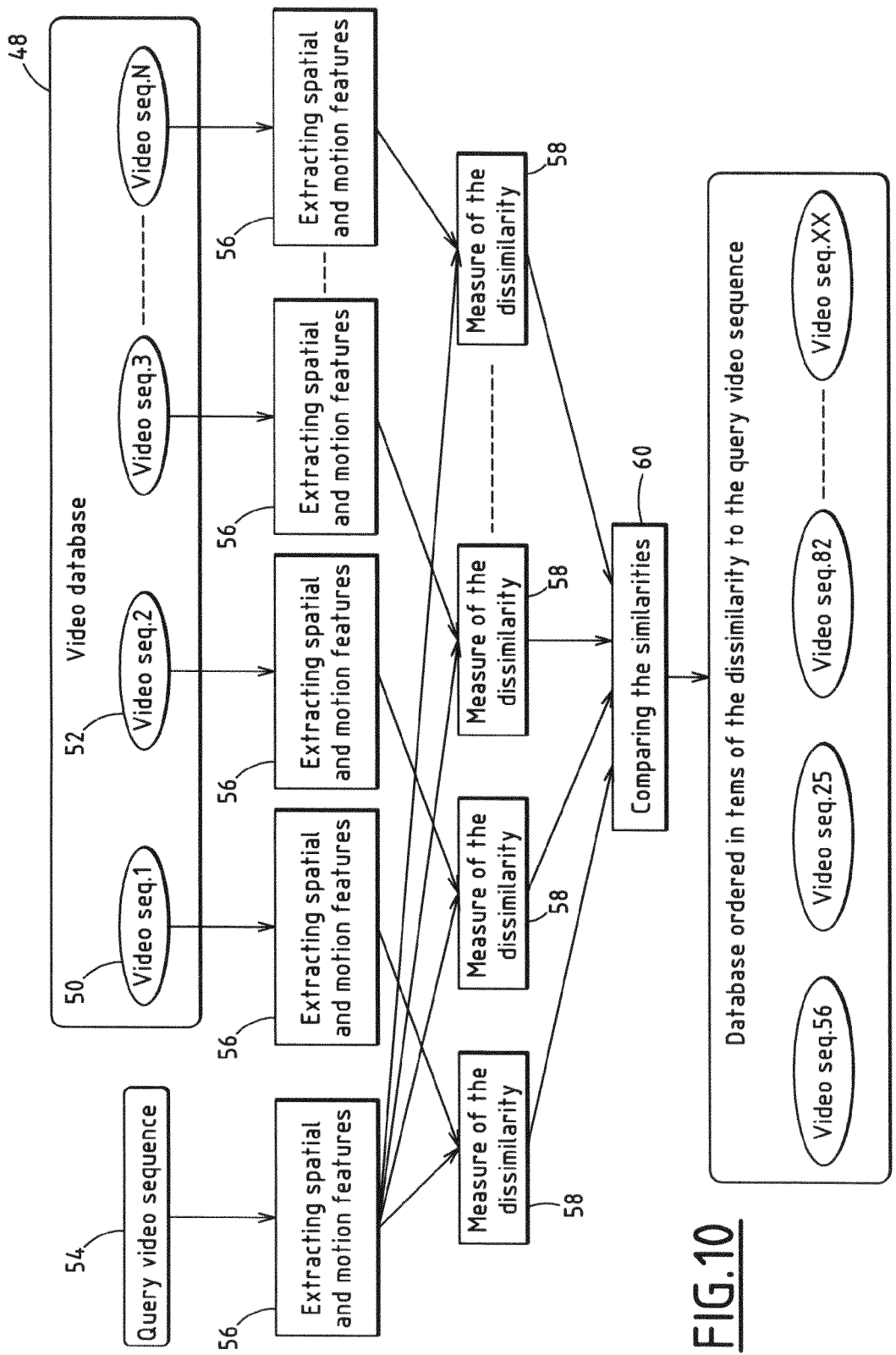
FIG. 10 is a block diagram illustrating the use of the method for measuring the dissimilarity between two video sequences, for content based video retrieval.

In reference to FIG. 10, a database 48 comprises N video sequences 50, 52 to order from the most to the less similar to a query video sequence 54.

The video retrieval method begins with a step 56 during which the spatial features and the motion features are extracted from the query video sequence 54 and from the target video sequence 50. Step 56 comprises the first stage 3 for the first image of the video sequence that extracts the spatial features of the video and the stage 41 that extracts the motion features of the video by steps 42, 44 and 46 for each GOP of the target video sequence 50.

Then, the dissimilarity between the query video sequence 54 and the video sequence 50 is evaluated at a step 58. Step 58 comprises the second stage 9 for spatial feature of the video sequence (spatial patches of the first frame of each GoP), and for the motion features of each video sequence (motion patches of each GoP).

Then, step 56 is performed on the video sequence 52 and step 58 is performed on the query video sequence 54 and on the video sequence 52 to evaluate their dissimilarity.

Steps 56 and 58 are performed for all the target video sequences of the database 48. Finally, in step 60, the similarities of the spatial patches and of the motion patches computed at each step 58 are compared and ranked from the lowest to the highest. The target video sequence the most similar to the query video sequence 54 is the video sequence having the lowest dissimilarity.

The detection of video (respectively image) copies from video (respectively image) databases also relies on the concept of dissimilarity between those. Solutions to this problem using the method according to the invention may be proposed.

In variant, other characteristics may be added to the spatial or motion patches such as a measure of the density of similar patches around a particular location.

In variant, weights may be introduced within the patches to account for the fact that different coordinates of the patches may have different units (and hence a different range of values).

Thus, the invention proposes a new global description based on Sparse Multiscale Patches. The key aspects of these descriptors are the following:
- A multiscale representation of the images;
- A sparse representation of the content of the image into a few elements;
- These elements are interscale/intrascale/interchannel patches that describe local spatial structures of different scales.

The visual content of images is represented by patches of multiresolution coefficients. The invention defines multidimensional feature vectors (patches) that capture interscale and intrascale dependencies among subband coefficients. These are better adapted to the description of local image structures and texture. The extracted feature vectors are viewed as samples from an unknown multidimensional distribution. The multiresolution transform of an image being sparse, a reduced number of patches yields a good approximation of the distribution.

The invention estimates the dissimilarity between images by a measure of "distance" between these multidimensional probability density functions. The invention uses the Kullback-Leibler divergence as a dissimilarity measure that quantifies the closeness between two probability density functions. The invention defines multidimensional feature vectors (patches), that capture interscale and intrascale dependencies among subband coefficients. These are better adapted to the description of local image structures and texture.

In addition, for color images, the invention takes into account the dependencies among the three color channels; hence patches of coefficients are also interchannel. This approach implies to estimate distributions in a high-dimensional statistical space, where fixed size kernel options to estimate distributions or divergences fail.

Alternatively, the invention proposes to estimate the Kullback-Leibler divergence directly from the samples with the k-th nearest neighbor (kNN) approach, i.e. adapting to the local sample density.

Moreover, the invention allows the measure of dissimilarity between two video sequences by computing the spatial and the motion dissimilarities between the corresponding Groups of Pictures of the two video sequences.

The invention claimed is:

1. A method for measuring the dissimilarity between a first and a second images, wherein the method comprises the following steps:
   a) multiresolution decomposing of the first and the second images to obtain coefficients of the first and of the second images, each coefficient being function of a scale and a location in space;
   b) constituting vectors hereafter named patches for the first and the second images; a patch at a given scale and a given location comprising:
      the coefficient having said given scale and said given location,
      at least one coefficient having said given scale and a location neighbor to said given location, and
      at least one coefficient having said given location and a scale neighbor to said given scale;
   c) evaluating a dissimilarity between a probability density function of patches having a given scale and belonging to the first image and a probability density function of patches having the same scale and belonging to the second image, said dissimilarity being a partial measure of the dissimilarity between the first and the second images for said given scale.

2. The method according to claim 1, further comprising:
   d) repeating step c) for patches having a scale different from the given scale; and
   e) summing the dissimilarity obtained for each scale, to obtain a measure of the dissimilarity between the first and the second images.

3. The method according to claim 1, wherein the step c) of evaluation of the dissimilarity is performed by evaluating a Kullback-Leibler divergence, the step of evaluation of the dissimilarity comprising a step of computing a difference between
   a cross-entropy of the probability density function of the first image patches and of the probability density function of the second image patches,
   and an entropy of the probability density function of the first image patches,
   said difference being representative of the dissimilarity between the first and the second images at said given scale.

4. The method according to claim 3, wherein for the computing step, the cross-entropy and the entropy are estimated with Ahmad-Lin estimators.

5. The method according to claim 4, wherein for the computing step, the probability density functions are estimated with a Balloon estimator, said Balloon estimator having a binary kernel and a bandwidth computed in the k-th nearest neighbor framework.

6. The method according to claim 4, wherein the computing step comprises a step of computing said cross-entropy, said step comprising the following steps:
   f) choosing one patch at a given scale of the first image;
   g) selecting the k-th nearest patch of the chosen patch, patch among the patches at said given scale belonging to the second image;
   h) computing the logarithm of the distance from the chosen patch to its k-th nearest patch, the distance being the Euclidean distance; and
   i) repeating steps f) to h) for every other patches of the first image at said given scale, and summing the logarithms obtained at step h), to obtain one part of the cross-entropy.

7. The method according to claim 5, wherein the computing step comprises a step of computing said entropy, said step comprising the following steps:
   j) choosing one patch at a given scale of the first image;
   k) selecting the k-th nearest patch of the chosen patch, the k-th nearest patch belonging to the first image and having said given scale;
   l) computing the logarithm of the distance from the chosen patch to its k-th nearest patch, the distance being the Euclidean distance; and
   m) repeating steps j) to l) for every other patches of the first image at said given scale, and summing the logarithms obtained at step l), to obtain one part of the entropy.

8. The method according to claim 1, wherein the multiresolution decomposition is a Laplacian transform.

9. The method according to claim 1, wherein the patch at scale j and location k comprises a coefficient at location k and scale j, a coefficient at location k−(0,1) and scale j, a coefficient at location k+(1,0) and scale j, a coefficient at location k−(1,0) and scale j, a coefficient at location k+(0,1) and scale j, and a coefficient at location k and scale j−1.

10. The method according to claim 1, wherein the images are color images and the patch comprises, for each image, coefficients representative of the luminance component and coefficients representative of the two chrominance components.

11. The method according to claim 1, further comprising a step of selecting the patches with the largest energies, the step of evaluation of the dissimilarity being only performed for the selected patches.

12. A method for ranking target images from the most similar to the less similar to a query image, the method comprising the following steps:
- performing the method of claim 1 for the query image and a first target image to determine the dissimilarity between the query and the first target image;
- performing the method of claim 1 for the query image and a second target image, to determine the dissimilarity between the query and the second target image; and
- comparing the dissimilarity between the query and the first target image to the dissimilarity between the query and the second target image, the target image the most similar to the query image being the image having the lowest dissimilarity.

13. A method for categorizing a query image into at least a first and a second category of images, each category being predefined, each category comprising similar images, the method comprising:
- performing the method of claim 1 for the query image and the prototype of the first category, to determine the dissimilarity between the query image and the prototype of the first category;
- performing the method of claim 1 for the query image and the prototype of the second category, to determine the dissimilarity between the query image and the prototype of the second category;
- categorizing the query image into the first category if the dissimilarity between the query image and the prototype of the first category is lower than the dissimilarity between the query image and the prototype of the second category, and into the second category otherwise; and
- generalization to more than two categories by computation of the dissimilarity between the query image and the prototype of each category by repeating performing the method of claim 1 for the query image and the prototype for each category.

14. A method for measuring the dissimilarity between a first and a second Group of Pictures, wherein the method comprises the following steps:
- a) computing the motion vectors between each pair of successive images of the Group of Pictures;
- b) constituting vectors hereafter named motion patches for the first and the second Group of Pictures; each motion patch comprising motion vectors located at the same location through one Group of Pictures;
- c) computing a dissimilarity between the probability density function of the motion patches belonging to the first Group of Pictures and the probability density function of the motion patches belonging to the second Group of Pictures, the dissimilarity evaluated being a measure of the dissimilarity between the first and the second Group of Pictures related to motion;
- d) computing a dissimilarity between the first image of the first Group of Pictures and the first image of the second Group of Pictures; said dissimilarity being computed according to claim 1 and being a measure of the dissimilarity between the first and the second Group of Pictures related to the spatial features;
- e) summing the motion dissimilarity obtained at step c) and the spatial dissimilarity obtained at step d) to obtain the measure of the dissimilarity between the first and the second Groups of Pictures.

15. The method according to claim 14, wherein the step c) of computing the dissimilarity is performed by evaluating a Kullback-Leibler divergence, the step of evaluating of the dissimilarity comprising a step of computing the difference between
- the cross-entropy of the probability density function of the first Group of Pictures motion patches and of the probability density function of the second Group of Pictures motion patches,
- and the entropy of the probability density function of the first Group of Pictures motion patches, said difference being representative of the dissimilarity between the first and the second Groups of Pictures related to motion.

16. The method according to claim 15, wherein for the computing step, the cross-entropy and the entropy are estimated with Ahmad-Lin estimators.

17. The method according to claim 15, wherein for the computing step, the probability density function are estimated with a Balloon estimator, said Balloon estimator having a binary kernel and a bandwidth computed in the k-th nearest neighbor framework.

18. The method according to claim 15, wherein the computing step comprises a step of computing said cross-entropy, said step comprising the following steps:
- f) choosing one motion patch of the first Group of Pictures;
- g) selecting the k-th nearest patch of the chosen patch, the k-th nearest patch belonging to the second Group of Pictures;
- h) computing the logarithm of the distance from the chosen patch to its k-th nearest patch, the distance being the Euclidean distance;
- i) repeating steps f) to h) for every other motion patch of the Group of Pictures, and summing the logarithms obtained at step h), to obtain one part of the cross-entropy.

19. The method according to claim 15, wherein the computing step comprises a step of computing said entropy, said step comprising the following steps:
- j) choosing one motion patch of the first Group of Pictures;
- k) selecting the k-th nearest patch of the chosen patch, the k-th nearest patch belonging to the first Group of Pictures;
- l) computing the logarithm of the distance from the chosen patch to its k-th nearest patch, the distance being the Euclidean distance;
- m) repeating steps j) to l) for every other motion patches of the first Group of Pictures, and summing the logarithms obtained at step l), to obtain one part of the entropy.

20. The method according to claim 15, wherein the method further comprises a step of selecting the motion patches, the step of evaluation of the dissimilarity being only performed for the selected patches, the selection being done by computing the energy of each motion patch, comparing the obtained value to a threshold and retaining only the motion patches for which the said value is higher than the said threshold.

21. The method according to claim 13, wherein the method comprises, for each category, a training step comprising:
- performing the method of claim 1 for all pair of images in the category, to determine the dissimilarities between the two images of each pair of images,
- defining the prototype of the category comprising patches representative of the feature common to the images of the category according to the dissimilarities in each pair of images.

22. A method for measuring the dissimilarity between a first and a second video sequences, wherein the method comprises the following steps:

a) dividing each video sequence into Groups of Pictures which are sequences of a plurality of consecutive frames;
b) computing spatial and motion dissimilarities between a Group of Pictures of the first video sequence and the Group of Pictures of the second video sequence corresponding to a same time frame, said computations being done for each pair of corresponding Group of Pictures of the two video sequences; and
c) summing said dissimilarities to obtain the dissimilarity between the two video sequences.

* * * * *